Patented Feb. 27, 1945

2,370,568

UNITED STATES PATENT OFFICE 2,370,568

HALOFORMATE ESTERS AND PROCESSES OF PRODUCTION

Irving E. Muskat and Franklin Strain, Akron, Ohio, assignors to Pittsburgh Plate Glass Company, Allegheny County, Pa., a corporation of Pennsylvania No Drawing. Application March 28, 1941, Serial No. 385,774

10 Claims. (Cl. 260—463)

This invention relates to a new group of compounds which may be termed polyhaloformates of polyhydroxy ethers. The new group of compounds may be prepared by reacting carbonyl chloride or bromide or similar halide with a polyhydroxy ether. In order to insure production of suitably high yields, the reaction is usually conducted at or below about 50° C. with cooling, if necessary. While higher temperatures may be used, lower yields may be obtained in such cases.

The invention is particularly related to the bis (chloroformates) of the polyglycols, particularly the 1,2-alkylene polyglycols such as diethylene, triethylene, tetraethylene, dipropylene, tripropylene, the di- or tributylene glycols. Other polyglycols having the general formula

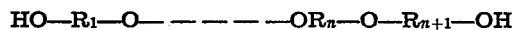

or

in which $R_1$, etc. may be the same or different aliphatic hydrocarbon or substituted hydrocarbon radicals and $n$ is a whole number denoting the number of ether linkages, are also within the scope of the present invention. For example, the polyglycols of tri-, tetra-, or pentamethylene glycol may be treated to form chloroformates or the compound $HOC_2H_4$—O—$C_3H_6OH$ may be so treated. In addition, polyhydroxy aromatic ethers such as bis(hydroxy phenyl) ether, bis(hydroxy diphenyl) ether, cresyl-hydroxy methyl ether, bis(hdroxy benzyl) ethers such as disalicyl ethers, bis(hydroxy naphthyl) ether, hydroxy methyl-hydroxy naphthyl ethers, hydroxy methyl-salicyl ether, hydroxy ethyl salicyl ether, etc., or heterocyclic polyhydroxy ethers such as 1,4,dioxanedoil 2,3,hydroxy cumaron

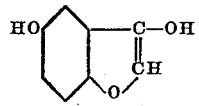

or the compound

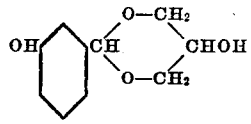

or bis (oxymethyl)furan

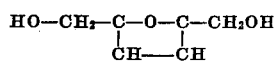

or the halogen substitution products of the above may be prepared.

The dichloroformates of the polyhydroxy ethers are generally colorless liquids but in the case of some larger molecule structures they may be solids. In general, they are insoluble in or immiscible with water. The liquids such as di- or tri-ethylene glycol dichloroformate have a faintly sweet odor and boil at high temperatures. They are stable over long periods of time although they may react with moisture in some cases to release some HCl. In general, these materials are miscible with various solvents, such as ethyl or methyl alcohol, acetone, benzene, toluene, xylene, etc.

The new materials are of value as solvents for many organic materials and have utility as plasticizers for many natural and synthetic resins such as phenol condensation resins, cellulose derivatives, butyral, polyvinyl acetate, and polymerized diallyl phthalates, carbonates, oxalates, etc. The materials are also valuable as intermediates in the synthesis of the corresponding diesters of the hydroxy ether and carbonic acid.

The following examples are illustrative:

Example I

An excess of phosgene was passed into 10 moles of dipropylene glycol at a rate of 100–150 millimoles per minute. The temperature was maintained at room temperature or below throughout the reaction. The product was heated to eliminate excess phosgene and the ester was recovered after washing with water and drying over calcium chloride. Dipropylene glycol dichloroformate, a colorless liquid which has a high boiling point and which is immiscible with water was recovered.

Example II

Twenty-five moles of phosgene was passed into 10 moles of triethylene glycol at a rate of approximately 100 millimoles per minute. Artificial cooling was used to prevent the heat of reaction from raising the temperature of the reaction mass above 40° C. When the reaction was completed the triethylene glycol dichloroformate was heated to drive off excess phosgene and thereafter was washed with water and dried over calcium chloride. This product is a colorless high boiling liquid having a specific gravity (20° C.) of about 1.34 and an index of refraction of about $(n_D^{20})$ 1.4565.

Example III

A slight excess of phosgene (22 moles) was passed into 10 moles of diethylene glycol at a rate of 30–150 millimoles per minute. The temperature was maintained between $+8$ and $+20°$ C. throughout the reaction. 1852 grams (80%) yield of diethylene glycol dichloroformate was recovered after washing with water and drying over calcium chloride. This compound is a colorless liquid having a faintly sweet odor, distilling at 140–142° C. under a pressure of about 9 millimeters of mercury and having a density $d27/4=1.35$.

Example IV

A sample of 100 gms. of tetraethylene glycol was treated with an excess of phosgene, added at the rate of 50 millimoles per minute. The temperature was maintained between 9 and 30° C. by artificial cooling. The dichloroformate of tetraethylene glycol was formed in a yield in excess of 90%. The product was a colorless liquid having a specific gravity (20° C.) of about 1.30 and an index of refraction $n_D^{30}=1.4588$.

Although the present invention has been described with particular reference to the specific details of certain embodiments thereof, it is not intended that such details shall be regarded as limitations upon the scope of the invention except insofar as included in the accompanying claims. The term "ether" in the accompanying claims is intended to include thio ethers.

This application is a continuation-in-part of copending application Serial No. 361,280, filed October 15, 1940.

We claim:
1. A bis (chloroformate) of a polyglycol.
2. A bis (haloformate) of a polyglycol.
3. Diethylene glycol bis (chloroformate).
4. Triethylene glycol bis (chloroformate).
5. Tetraethylene glycol bis (chlorformate).
6. A bis (chloroformate) of an aliphatic polyglycol.
7. A bis (chloroformate) of a 1,2-alkylene polyglycol.
8. A method which comprises reacting phosgene with a polyglycol at a temperature below 50° C.
9. A method which comprises reacting phosgene with a polyethylene glycol at a temperature below 50° C.
10. A method which comprises reacting phosgene with a polyalkylene glycol at a temperature below 50° C.

IRVING E. MUSKAT.
FRANKLIN STRAIN.